United States Patent
Todaka

(10) Patent No.: US 7,882,277 B2
(45) Date of Patent: Feb. 1, 2011

(54) PROCESSOR, DATA TRANSFER UNIT, MULTICORE PROCESSOR SYSTEM

(75) Inventor: Takashi Todaka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 12/172,891

(22) Filed: Jul. 14, 2008

(65) Prior Publication Data

US 2009/0063812 A1   Mar. 5, 2009

(30) Foreign Application Priority Data

Aug. 29, 2007   (JP) .............................. 2007-222419

(51) Int. Cl.
G06F 13/28   (2006.01)
G06F 13/00   (2006.01)

(52) U.S. Cl. ................................. 710/24; 710/33; 714/2

(58) Field of Classification Search ................. 710/5–6, 710/15–19, 22–24, 33–34, 58; 714/15–21
See application file for complete search history.

(56) References Cited

U.S. PATENT DOCUMENTS

| | | | | |
|---|---|---|---|---|
| 4,435,762 A | * | 3/1984 | Milligan et al. ................. | 710/6 |
| 5,379,385 A | * | 1/1995 | Shomler ....................... | 711/211 |
| 5,392,425 A | * | 2/1995 | Elliott et al. ................... | 714/16 |
| 5,717,952 A | * | 2/1998 | Christiansen et al. ......... | 710/22 |
| 5,901,327 A | * | 5/1999 | Ofek .............................. | 710/5 |
| 6,298,398 B1 | * | 10/2001 | Elliott et al. ................... | 710/30 |
| 6,671,767 B2 | * | 12/2003 | Furuumi et al. ............. | 711/100 |
| 2002/0052985 A1 | * | 5/2002 | Furuumi et al. ................ | 710/5 |
| 2006/0224795 A1 | | 10/2006 | Muto et al. | |

FOREIGN PATENT DOCUMENTS

| | | |
|---|---|---|
| JP | 11-212898 A | 8/1999 |
| JP | 2006-277583 A | 10/2006 |

* cited by examiner

*Primary Examiner*—Christopher B Shin
(74) *Attorney, Agent, or Firm*—Miles & Stockbridge P.C.

(57) ABSTRACT

A processor includes a CPU capable of performing predetermined arithmetic processing, a memory accessible by the CPU, and a data transfer unit capable of controlling data transfer with the memory by substituting for the CPU. The data transfer unit is provided with a command chain unit for continuously performing data transfer by execution of a preset command chain, and a retry controller for executing a retry processing in case a transfer error occurs during data transfer by the command chain unit. Then, the data transfer unit reports a command relating to the transfer error to the CPU after completion of the execution of the command chain, thereby lessening the number of interruptions for error processing, and attaining enhancement in performance of a system.

4 Claims, 4 Drawing Sheets

PROCESSOR, DATA TRANSFER UNIT, MULTICORE PROCESSOR SYSTEM

CLAIM OF PRIORITY

The present application claims priority from Japanese patent application JP 2007-222419 filed on Aug. 29, 2007, the content of which is hereby incorporated by reference into this application.

FIELD OF THE INVENTION

The invention relates to a data transfer technology for executing data transfer, substituting for a CPU (a central processing unit).

BACKGROUND OF THE INVENTION

With an information processing unit such as a processor, and so forth, if data transfer is efficiently performed, this will lead to enhancement in performance of the information processing unit on the whole. In the case where the information processing unit performs transfer of a massive amount of data, if such transfer is carried out with a CPU (a general purpose processor), this will cause delay in processing that is to be primarily performed by the CPU, so that the performance of the unit on the whole undergoes deterioration.

Accordingly, with a current information processing unit, data transfer is performed by use of a data transfer processing unit, generally called a direct memory access controller (DMAC), substituting for the CPU. Hence, it becomes possible for the CPU itself to perform other processing while the DMAC performs the data transfer only by setting a data transfer activation command to the DMAC.

With such a method as described, the CPU needs to set the data transfer activation command one by one to the DMAC every time data transfer is required. Further, there arises the need for monitoring whether or not the DMAC is in operation.

If the CPU performs setting of the data transfer activation command every time data transfer is performed as described, this will not be seen as large overhead in the case of a transfer data length being long, however, in the case of the transfer data length being short, this will be seen as large overtime, thereby interfering with enhancement in performance.

As a method for reducing the number of times the data transfer activation command is set by the CPU, there has been proposed a method called a command chain, or CCW (channel command word) chain. With the command chain, instead of the data transfer activation command being given to the DMAC via the CPU every time data transfer is performed, a list of all data transfer commands is preset in a memory, and upon the CPU giving an instruction to perform data transfer by starting from the data transfer command at the top of the list, the DMAC sequentially reads the data transfer commands in the memory, thereby performing data transfers.

With this method, since the CPU performs only a first activation of a data transfer, and the DMAC itself performs activation(s) of the data transfer command(s) with respect to data transfers thereafter, the number of times the data transfer activation command is set by the CPU will be only one. Hence, it becomes possible for the CPU to allocate time required for setting the data transfer command before to other processing.

Now, there have been known a technology (for example, JP-A No. Heill(1999)-212898) for enabling continuous processing without interruption in writing to a hard disc in the case of data transfer using the CCW (channel command word) chain intended for a data chain, and a technology (for example, JP-A No. 2006-277583) whereby a return code for transfer on a CCW unit is checked, and CCW to be next executed is decided according to the return code, thereby alleviating a processing burden on a host.

SUMMARY OF THE INVENTION

With the use of the background technologies described in the foregoing, it is possible to cause processing by the CPU to efficiently overlap data transfer, thereby enhancing system performance. However, in case an error occurs to data transfer in the command chain, there arises the need for the DMAC interrupting the data transfer through the command chain, and submitting an error report to the CPU to thereby make a request to the CPU for recovery processing, and so forth. In case an error occurs to a plurality of data transfer commands in the command chain, respectively, there arises the need for the DMAC submitting an error report to the CPU every time the error occurs to subsequently make a request to the CPU for recovery processing, and so forth, thereby causing delay in the processing to be primarily performed by the CPU.

It is therefore an object of the invention to provide a technology for lessening overhead associated with processing for data transfer error in a command chain.

The above and further objects and novel features of the invention will be apparent from the following detailed description and accompanying drawings.

A representative one of embodiments of the invention, disclosed under the present application, is briefly described as follows.

More specifically, in accordance with one aspect of the invention, there is provided a processor comprising a CPU capable of performing predetermined arithmetic and logical processing, a memory accessible by the CPU, and a data transfer unit capable of controlling data transfer with the memory by substituting for the CPU, the data transfer unit comprising a command chain unit for continuously performing data transfer by execution of a preset command chain, and a retry controller for executing a retry processing in case a transfer error occurs during data transfer by the command chain unit. Then, the data transfer unit reports a command relating to the transfer error to the CPU after completion of the execution of the command chain, and the number of interruptions for error-processing is lessened, thereby attaining enhancement in the performance of a system as a whole.

There is briefly described an advantageous effect of the representative one of the embodiments of the invention, disclosed under the present application, as follows.

That is, it is possible to lessen overhead associated with processing for data transfer error, in the command chain.

DETAILED DESCRIPTION OF THE PREFERRED EMBODIMENTS

1. Representative Embodiment of the Invention

Figure 1:
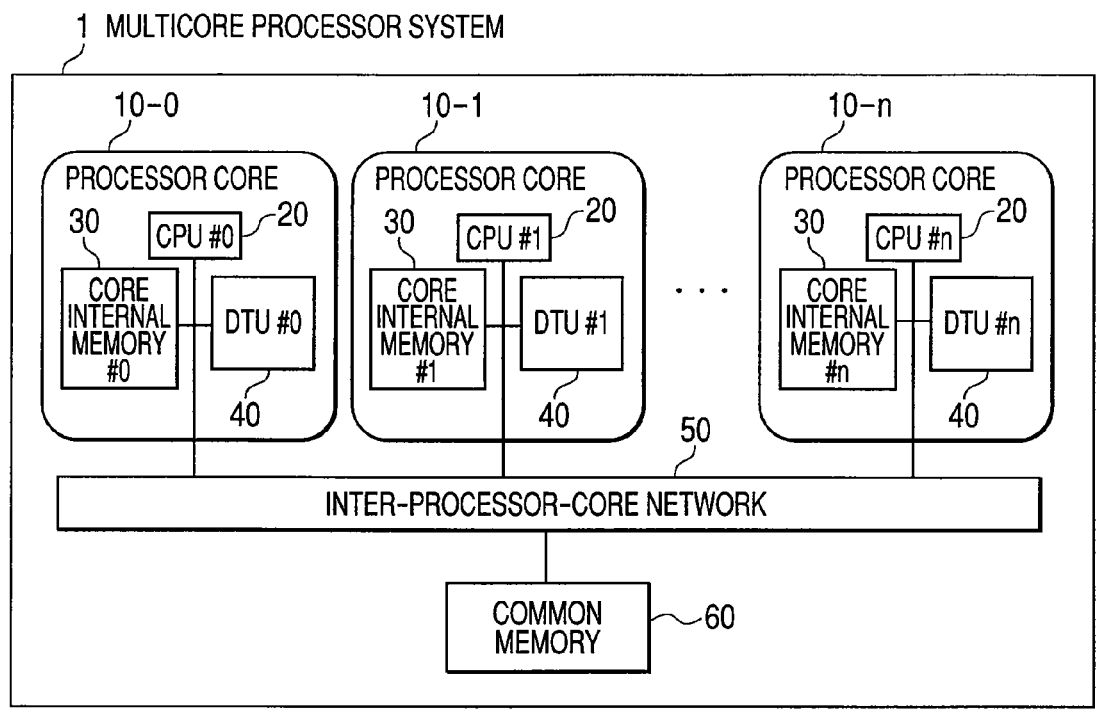
FIG. 1 is a block diagram of one embodiment of a multicore processor system according to the invention.

First, a representative embodiment of the invention, disclosed under the present application, is broadly described hereinafter. In the broad description with respect to the representative embodiment of the invention, each of reference numerals in the accompanying drawings, in the parentheses, to which reference is made, indicates only what is contained in the concept of a component with a reference numeral affixed thereto by way of example.

A multicore processor system (1) according to the representative embodiment of the invention includes a plurality of processor cores (10-0, 10-1, . . . , 10-$n$) each capable of performing predetermined arithmetic and logical processing, and a common memory (60) shared by the plurality of the processor cores. In this case, the processor core includes a CPU (20) capable of performing the predetermined arithmetic processing, a core internal memory (30) accessible by the CPU, and a data transfer unit (40) capable of controlling data transfer between the core internal memory and the common memory by substituting for the CPU. Further, the data transfer unit includes a command chain unit (420) for continuously performing data transfer by execution of a preset command chain, and a retry controller (430) for performing a retry-processing in case a transfer error occurs during data transfer by the command chain unit, and reports a command relating to the transfer error to the CPU after completion of the execution of the command chain.

The number of retries at the retry controller (430) is set for every command in the command chain.

In case the transfer error cannot be avoided by the retry, the retry controller (430) is capable of causing the command chain unit (420) to skip the command relating to the transfer error to thereby execute a command succeeding thereto.

The retry controller (430) includes a memory region where the command(s) relating to transfer error can be stored successively on their occurrences, and those commands stored in the memory region are reported to the CPU all together after completion of the execution of the command chain.

2. Description of the Embodiment of the Invention

Next, the embodiment of the invention is described in further detail hereinafter.

In FIG. 1, there is shown a configuration of the multicore processor system (information processing system) according to the invention by way of example.

In FIG. 1, the multicore processor system 1 is made up mainly of the plurality of the processor cores 10-0 to 10-$n$, the common memory 60 shared by those processor cores 10-0 to 10-$n$, and an inter-processor-core network 50 for connecting each of the processor cores 10-0 to 10-$n$ to the common memory 60 although not particularly limited thereto. Further, the multicore processor system 1 is formed over one semiconductor substrate such as a silicon substrate, and so forth, by use of the known technology for manufacturing a semiconductor integrated circuit. The inter-processor-core network 50 may be composed of a common bus, cross bar, and so forth.

With the present invention, there is shown a homogeneous multicore processor system wherein the processor cores are identical in instruction set and configuration to each other by way of example. Accordingly, the configuration of the processor core 10-0 only will be described, thereby omitting detailed description of the other processor cores.

The processor core 10-0 is composed of the CPU 20 for performing arithmetic and logical processing, the core internal memory (local memory) 30 for storing data and instructions, and the data transfer unit (DTU: Data Transfer Unit) 40 for performing data transfer between the core internal memory 30 and the common memory 60 or between the core internal memory 30, and each of the core internal 30 in other processor cores 10-1 to 10-$n$. Further, in the case where a memory is connected to the outside of the multicore processor system 1, the data transfer unit 40 is capable of performing data transfer between the core internal memory 30 and an external memory.

The data transfer unit 40 is made up so as to include a DMAC (direct memory access controller) although not particularly limited thereto, performing data transfer between the core internal memory 30, and the common memory 60, or each of the other processor cores 10-1 to 10-$n$, in a background process of the CPU 20.

Further, upon receiving a data transfer command from the CPU 20, the data transfer unit 40 can continuously perform data transfer by virtue of the DMAC, and a command chain. After the CPU 20 gives the data transfer command to the data transfer unit 40, the CPU 20 can perform its own arithmetic and logical processing by leaving processing for the data transfer to the data transfer unit 40.

Figure 2:
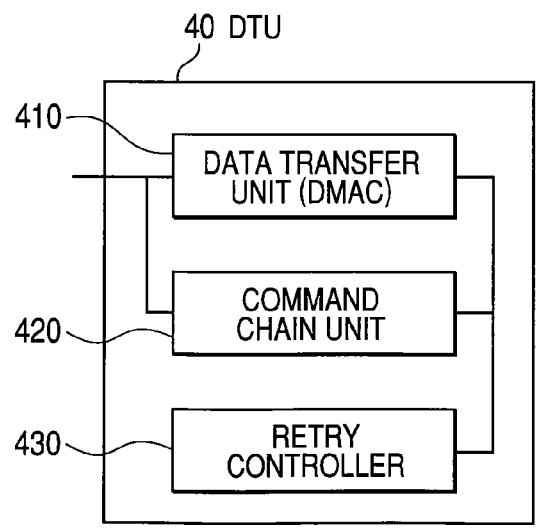
FIG. 2 is a block diagram of a data transfer unit included in the multicore processor system.

FIG. 2 shows a configuration of the data transfer unit 40 by way of example.

The data transfer unit 40 includes the command chain unit 420 for sequentially executing a command sequence containing data transfer commands pre-written to the core internal memory 30 (or the common memory 60), a data transfer unit 410 for performing data transfer between the core internal memory 30, and the common memory 60 by use of the DMAC, on the basis of a data transfer command as read by the command chain unit 420, and a retry controller 430 for determining whether or not a transfer error has occurred on the basis of the data transfer command as read by the command chain unit 420, and performing retry of data transfer as necessary.

The command chain unit 420 reads and performs a first command of the command sequence (command chain) set in the core internal memory 30 (or the common memory 60) in accordance with an instruction from the CPU 20. Then, upon completion of one command, the command chain unit 420 reads and performs the next command in order. In this case, a command to be next executed can be designated in respective commands in the command chain.

The commands to be processed by the data transfer unit 410 of the data transfer unit 40 include a put command for transferring data from the core internal memory 30 to the memory outside of the processor core, and a get command for transferring data from the memory outside of the processor core to the core internal memory 30. Those transfers can be performed not only from the command chain but also from the CPU by directly operating the data transfer unit 410.

The data transfer unit 410 is made up so as to include the DMAC, and performs the put command, and the get command as a transfer command, respectively, thereby implementing data transfer between the core internal memory 30, and the common memory 60, or each of the other processor cores 10-1 to 10-$n$. The data transfer unit 40 performs data transfers for non-contiguous addresses, such as stride transfer, gather transfer, and scatter transfer, in addition to data transfer in a contiguous region.

Figure 3:
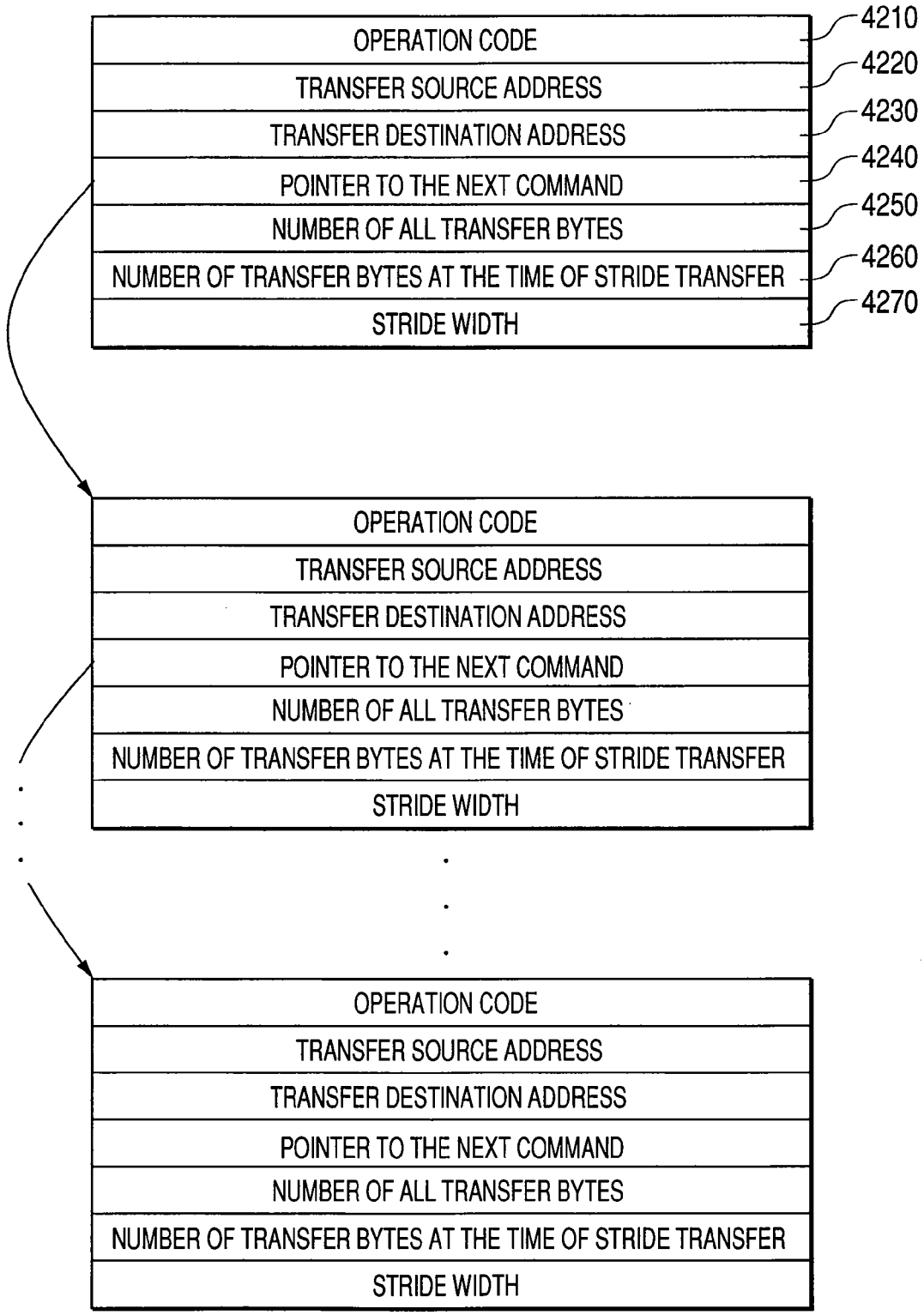
FIG. 3 is a schematic illustration showing organization of a command sequence handled by a command chain unit included in the data transfer unit.

FIG. 3 shows organization of the command sequence handled by the command chain unit 420 by way of example.

The put command, the get command, and the transfer commands for the stride transfer, gather transfer, scatter transfer, and so forth, together with retry-conditions, are set in an operation code 4210. The retry conditions include the number of retries made at the time of a transfer error. Transfer source address 4220, and transfer destination address 4230 each designate respective addresses of the core internal memory 30, and the common memory 60, subject to the transfer, respectively. A pointer 4240 to the next command indicates a command to be next executed. Number of all transfer bytes 4250 designates the number of all transfer bytes to be transferred by the present command. Number of transfer bytes 4260 at the time of stride, and stride width 4270 are effective when the stride transfer, gather transfer, scatter transfer are designated in the operation code 4210, each designating block size, and an inter-block width, as a transfer object, respectively. The number of transfer bytes 4260 at the time of stride, and the stride width 4270 have no effect when the stride transfer, gather transfer, scatter transfer are not executed, in which case, there is no need for setting thereof.

The retry controller 430 holds transfer control information that is necessary when an error occurs to data transfer, and a retry of the data transfer is executed. The transfer control information transmitted from the data transfer unit 410 at the start of data transfer is stored, and it resets the information in the data transfer unit 410 at the time of a retry. Further, the retry controller 430 has a function for determining conditions under which the information is reset in the data transfer unit 410.

Figure 4:
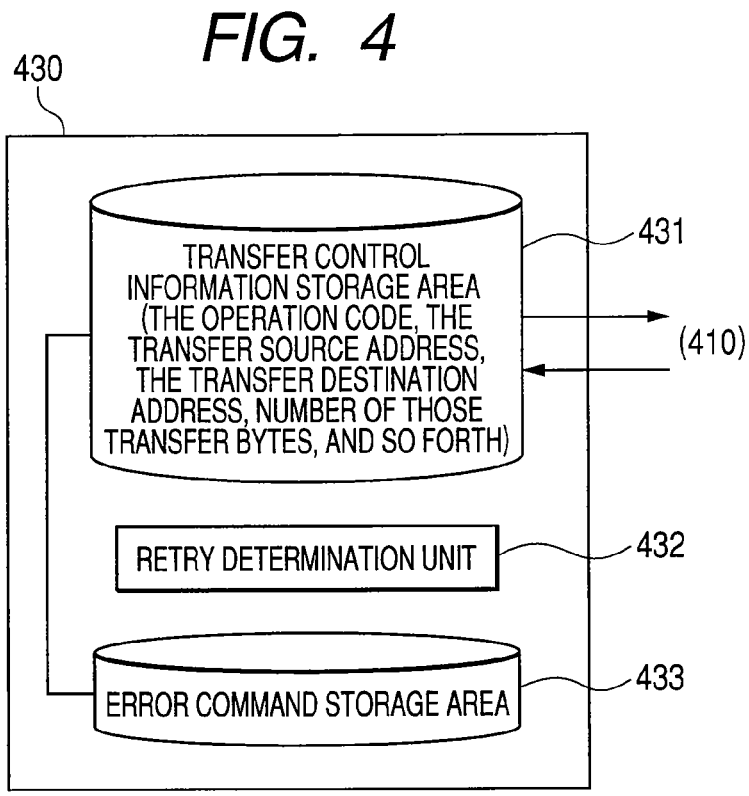
FIG. 4 is a block diagram of a retry controller included in the data transfer unit.

FIG. 4 shows a configuration of the retry controller 430 by way of example.

The retry controller 430 includes a transfer control information storage area 431, a retry determination unit 432, and an error command storage area 433 although not particularly limited thereto. Prior to the data transfer unit 410 starting data transfer, the retry controller 430 receives the transfer control information, such as the operation code, the transfer source address, the transfer destination address, the number of those transfer bytes, and so forth, from the data transfer unit 410, thereby holding the transfer control information in the transfer control information storage area 431. In case a data transfer causes an error, the retry determination unit 432 determines the retry-conditions set in an operation code. If a retry is required, the transfer control information held in the transfer control information storage area 431 is reset in the data transfer unit 410, thereby performing the same data transfer again. It is the case of normal completion of a data transfer command, or the case where it is determined that the normal completion is not possible even by retrying, when the retry determination unit 432 determines that a retry is unnecessary. In the case where it is determined that the normal completion is not possible even by retrying, the pointer to the command at which an error has occurred and so forth are stored in the error command storage area 433, and the next command is executed by the command chain unit 420, and the data transfer unit 410. The number of retries, a system error, and so forth can be used as criteria for determination that the normal completion is not possible even by retrying. Further, there is no need for the error command storage area 433 being in the retry controller 430, and the error command storage area 433 may be provided in the core internal memory 30, or the common memory 60.

Next, specific example of an operation is described hereinafter.

Figure 5:
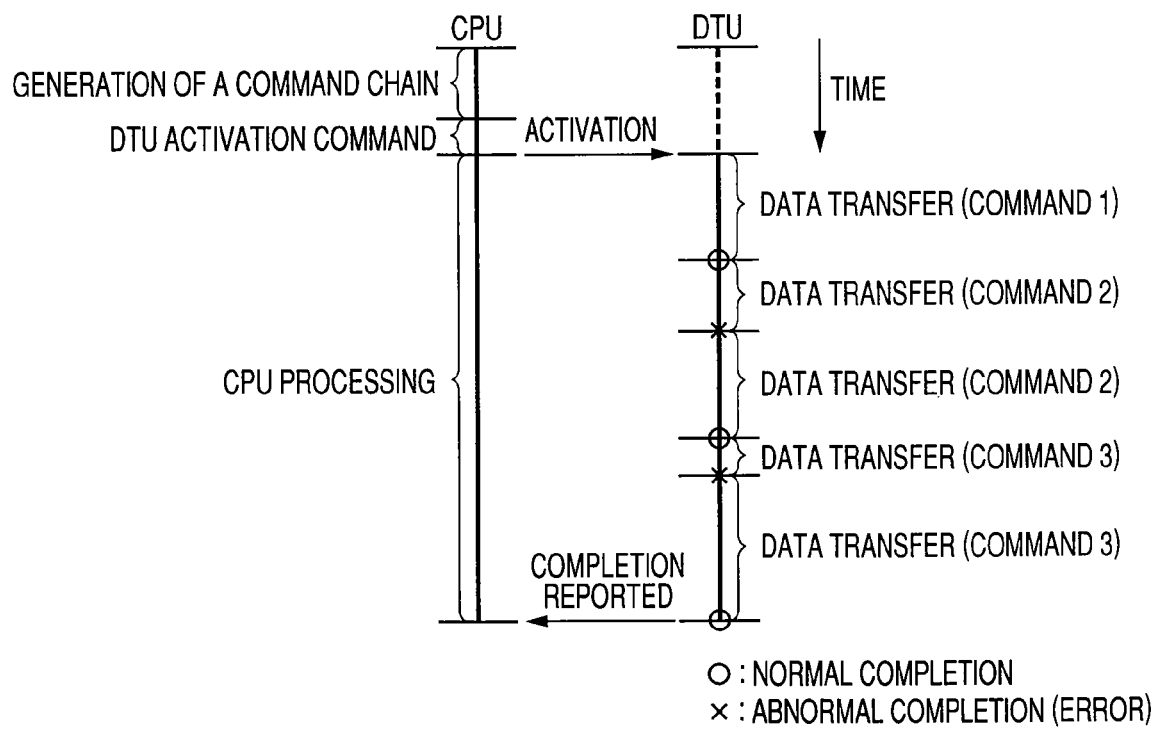
FIG. 5 is a schematic illustration showing an operation of the multicore processor system.
Figure 6:
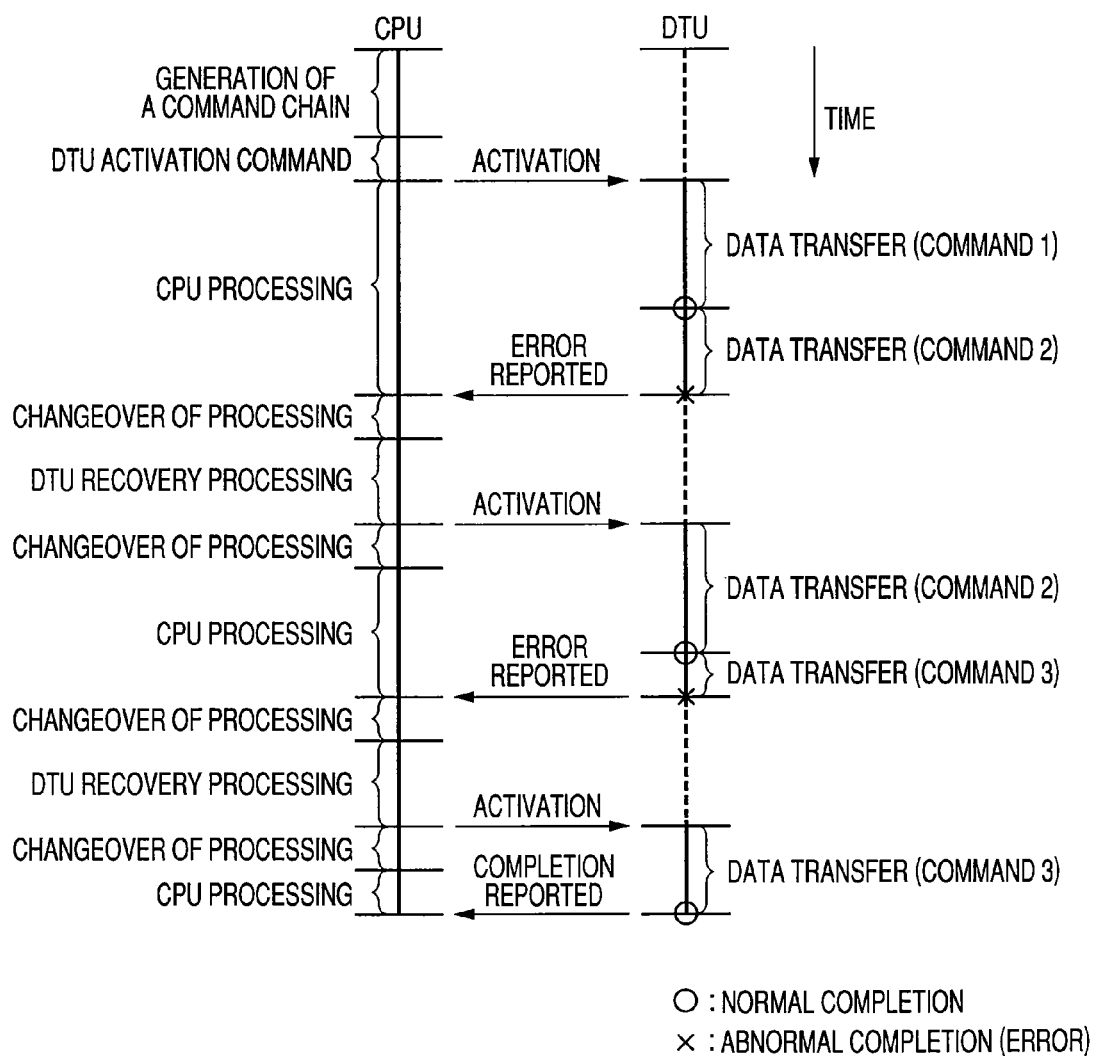
FIG. 6 is a schematic illustration showing an operation of a system for use as an object for comparison.

In FIG. 5, there is shown the operation of the multicore processor system shown in FIG. 1 by way of example. FIG. 6 shows an example of an operation of a system for use as an object for comparison. In either FIG. 5, or FIG. 6, the CPU 20 first generates a command chain to be given to the data transfer unit (DTU 40), and gives a data transfer activation command to the DTU 40. Further, the command chain for use in data transfer is composed of three commands, namely, command 1, command 2, and command 3, and in the case of this example, abnormal completion occurs once during execution of the command 2, and once during execution of the command 3, respectively.

In FIG. 6, due to abnormal completion of the command 2, the DTU submits an error report to the CPU, whereupon the CPU interrupts the CPU processing being performed up to then to thereby change over to recovery processing, and returns to the interrupted CPU processing after activating the DTU again. In contrast, as shown in FIG. 5, with the present embodiment, upon the abnormal completion of the command 2, the retry controller 430 operates, and retries the data transfer of the command 2 without submitting the error report to the CPU 20, so that the CPU 20 can continuously perform the CPU processing (the arithmetic processing) that is to be primarily performed by the CPU without knowing occurrence of an error. Hence, with the present embodiment, it is possible to enhance throughput of the CPU 20, and throughput of the DTU 40, so that enhancement in performance of the system as a whole can be attained.

With the present embodiment, there has been described the case where the normal completion of the data transfer command is achieved by only one retry, but advantageous effects of the invention will be found more pronounced as the number of retries increases. Further, if the normal completion of the data transfer command is not achieved regardless of the number of retries, the retry controller 430 stores a command that has not been normally completed in the error command storage area 433, thereby executing a command succeeding thereto. Accordingly, the CPU 20 does not interrupt the processing thereof during execution of a series of the command chains, but the CPU 20 interrupts the processing thereof only once after completion of the execution of the command chains, and performs programmed processing such as re-execution, error processing, and so forth if a command that has been abnormally completed is stored in the error command storage area 433.

With this example, the following advantageous effects of operation can be obtained.

(1) Even if a transfer error occurs, the data transfer unit itself executes a retry, so that the CPU 20 can continue to perform its own processing without stopping processing by the CPU 20.

(2) In the case where there exist a plurality of commands unable to avoid a transfer error even by retrying, it is possible to lessen the number of interruptions for error-processing by skipping such erroneous commands, and submitting an error report on the commands as compiled after completion of the command chain to the CPU 20, so that enhancement in the performance of the system as a whole can be attained.

(3) Owing to advantageous effects of the operation described under (1), and (2) as above, it is possible to lessen overhead associated with processing for data transfer error, in the command chain.

Having specifically described the embodiment of the invention developed by the inventor in the foregoing, it is to be pointed out that the invention be not limited thereto, and that various changes and modifications can be obviously made in the invention without departing from the spirit and scope thereof.

For example, with the embodiment described in the foregoing, the system made up over one chip has been described, however, it is to be understood that the invention is not limited thereto, and is also applicable to a system made up over a plurality of chips.

In the above description, the invention developed by the inventor has been explained mainly with reference to the multicore processor system made up over one chip, which is an applicable field as the background of the invention, however, the invention is not limited thereto, and is also applicable to a system made up over a plurality of chips.

What is claimed is:

1. A multicore processor system comprising a plurality of processor cores, each capable of performing predetermined arithmetic and logical processing, and a common memory shared by the plurality of the processor cores, wherein the processor core includes:

a CPU capable of performing predetermined arithmetic and logical processing;

a core internal memory accessible by the CPU; and a data transfer unit capable of controlling data transfer between the core internal memory and the common memory, by substituting for the CPU, the data transfer unit includes:

a command chain unit for continuously performing data transfer by execution of a preset command chain; and a retry controller for performing a retry-processing in case a transfer error occurs during data transfer by the command chain unit, wherein the data transfer unit reports a command relating to the transfer error to the CPU after completion of the execution of the command chain.

2. The multicore processor system according to claim 1, wherein the number of retries at the retry controller is set for every command in the command chain.

3. The multicore processor system according to claim 1, wherein if the transfer error cannot be avoided by the retry, the retry controller is capable of causing the command chain unit to skip the command relating to the transfer error to thereby execute a command succeeding thereto.

4. The multicore processor system according to claim 1, wherein the retry controller includes a storage area capable of sequentially storing commands relating to the transfer error, and the commands stored in the storage area are reported all together to the CPU after completion of the command chain.

* * * * *